(12) United States Patent
Dennis

(10) Patent No.: US 6,168,189 B1
(45) Date of Patent: Jan. 2, 2001

(54) AIRBAG COVER

(75) Inventor: Michael Keith Dennis, Lakeland, FL (US)

(73) Assignee: Breed Automotive Technology, Inc., Lakeland, FL (US)

( * ) Notice: Under 35 U.S.C. 154(b), the term of this patent shall be extended for 0 days.

(21) Appl. No.: 09/152,436

(22) Filed: Sep. 14, 1998

(51) Int. Cl.[7] .................................................. B60R 21/20
(52) U.S. Cl. ........................................ 280/728.3; 280/731
(58) Field of Search .................................. 280/728.3, 731

(56) References Cited

U.S. PATENT DOCUMENTS

| | | | |
|---|---|---|---|
| 5,060,971 | * | 10/1991 | Nanbu et al. ........................ 280/728 |
| 5,118,132 | * | 6/1992 | Nakajima .............................. 280/731 |
| 5,183,289 | * | 2/1993 | Zeller et al. .......................... 280/743 |
| 5,449,196 | * | 9/1995 | Ohno et al. ........................ 280/728.3 |
| 5,480,184 | * | 1/1996 | Young .................................. 280/731 |
| 5,499,842 | * | 3/1996 | Yamamoto et al. .............. 280/728.3 |
| 5,533,749 | * | 7/1996 | Leonard et al. .................. 280/728.3 |
| 5,641,554 | * | 6/1997 | Koizumi et al. .................. 280/728.3 |
| 5,698,283 | * | 12/1997 | Yamasaki et al. ...................... 428/43 |
| 5,725,241 | * | 3/1998 | Schenck ................................ 280/731 |
| 5,971,429 | * | 10/1999 | Bramberger et al. ................ 280/731 |
| 5,997,031 | * | 12/1999 | Heilig ................................ 280/728.3 |
| 6,003,895 | * | 12/1999 | Niwa et al. ........................ 280/728.3 |
| 6,082,762 | | 7/2000 | Preisler et al. ........................ 280/731 |

\* cited by examiner

Primary Examiner—J. J. Swann
Assistant Examiner—J. Allen Shriver
(74) Attorney, Agent, or Firm—Beth Vrioni; Lonnie Drayer

(57) ABSTRACT

An airbag cover includes a tear seam formed by a groove in the front side of the airbag cover as well as the groove in the back side of the airbag cover. These grooves are separated by a transverse layer. The transverse layer has a length, thickness and angle or orientation with respect to the airbag cover. This length, thickness, and angle vary at different locations along the tear seam. These variations permit control over the speed at which the deployment door opens as well as the order in which different portions of the tear seam tear.

9 Claims, 7 Drawing Sheets

AIRBAG COVER

BACKGROUND OF THE INVENTION

This invention pertains to the field of airbag covers, such as are used in automobile steering wheels, and more specifically to tear seams, deployment doors and hinges in airbag covers.

Tear seams in airbag covers tear upon the deployment of an airbag. Conventional airbag covers feature tear seams which consist of a groove in the airbag cover. The groove provides a weakened place in the airbag cover wherein the deploying airbag can easily break through. Generally, the groove has a thickness less than that of the other portions of the airbag cover. This reduced thickness weakens the tear seam such that it ruptures upon deployment of the airbag.

Because the tear seam is of a reduced thickness, the tear seam can be visible as an indented line in the airbag cover. Conversely, tear seams may be hidden from view by being embodied in the reverse side of the airbag cover such that it is not visible to an occupant of the vehicle.

The grooves which create conventional tear seams have substantially constant depths. Because these depths do not vary, the tensile strength of the tear seam remains substantially the same throughout the tear seam. While this tensile strength is weaker than that of the remaining area of the airbag cover such that the tear seam tears before any other part of the airbag cover, the tearing of the tear seam is not easily controllable. Neither the rate of tearing of the tear seam nor the location along the tear seam wherein the tear seam first tears is easily controllable. Thus, for example, if an end of the tear seam tears before the center of the tear seam, the airbag will not deploy evenly. Rather, the airbag will deploy through the end of the tear seam, which tears first, and then push its way through the remainder of the tear seam. This could result in less than optimal deployment of the airbag.

SUMMARY OF THE INVENTION

According to one aspect of the present invention, an airbag cover is provided which has a novel tear seam. The tear seam is a groove formed in the front of the airbag cover as well as a groove formed in the back of the airbag cover. These front and back grooves are slightly out of alignment, being separated by a thin transverse layer of the airbag cover. The transverse layer has a length and width, both of which vary at different locations along the tear seam. The centerline of the transverse layer is oriented at an angle with respect to the airbag cover. Like the transverse layer's length and width, this angle varies at different locations along the tear seam.

According to another aspect of the present invention, the tear seam defines a pair of deployment doors in the airbag cover. The deployment doors are formed in the airbag cover and open by rotating around hinges upon the deployment of the airbag. The hinges may be formed in the airbag cover by removing a portion of the back side of the airbag cover. The airbag cover may also comprise reinforcing means to strengthen the hinges.

According to another aspect of the present invention, the airbag cover has an essentially circular configuration. This differs from conventional airbag covers that have substantially square or rectangular configurations.

One advantage of the present invention is that variation of the transverse layer's length, width and angle permits the tearing of the tear seam to be controllable. The speed at which the tear seam tears and the speed at which the deployment doors open, as well as which part of the tear seam tears first can, be controlled. Additionally, fatigue failure can be prevented at locations along the tear seam, which receive considerable stress. For example, in designs where the vehicle horn is activated by depressing the airbag cover, the portion of the tear seam running through the section of the airbag cover that is depressed when the driver activates the horn can be configured to have a greater integrity.

Another advantage of the present invention is the reduction in material mass in a portion of the back side of the airbag cover. The removal of some material forms hinges within the airbag cover to permit the deployment doors to pivot open to a greater degree without tearing the hinges. The reinforcing means also aids in preventing the deployment doors from completely detaching from the airbag cover during airbag deployment.

Another advantage of the present invention is that the tear seam, unlike conventional tear seams, enables an emblem to be mounted on the front side of the airbag cover. For example, a portion of the tear seam may be configured to follow a portion of the outline of the emblem. Such design is shown herein as a semi-circle in the middle of the airbag cover. This would permit a round emblem to be mounted onto the front of the airbag cover. Upon deployment of the airbag, the tear seam would tear forming two doors out of the airbag cover. The doors would open and the airbag would deploy through the airbag cover. The round emblem, outlined by the semi-circular tear seam prior to the deployment of the airbag, would then be retained on one of the doors of the airbag cover after the semi-circular tear seam tears and the airbag deploys through the airbag cover.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE INVENTION

Figure 1:
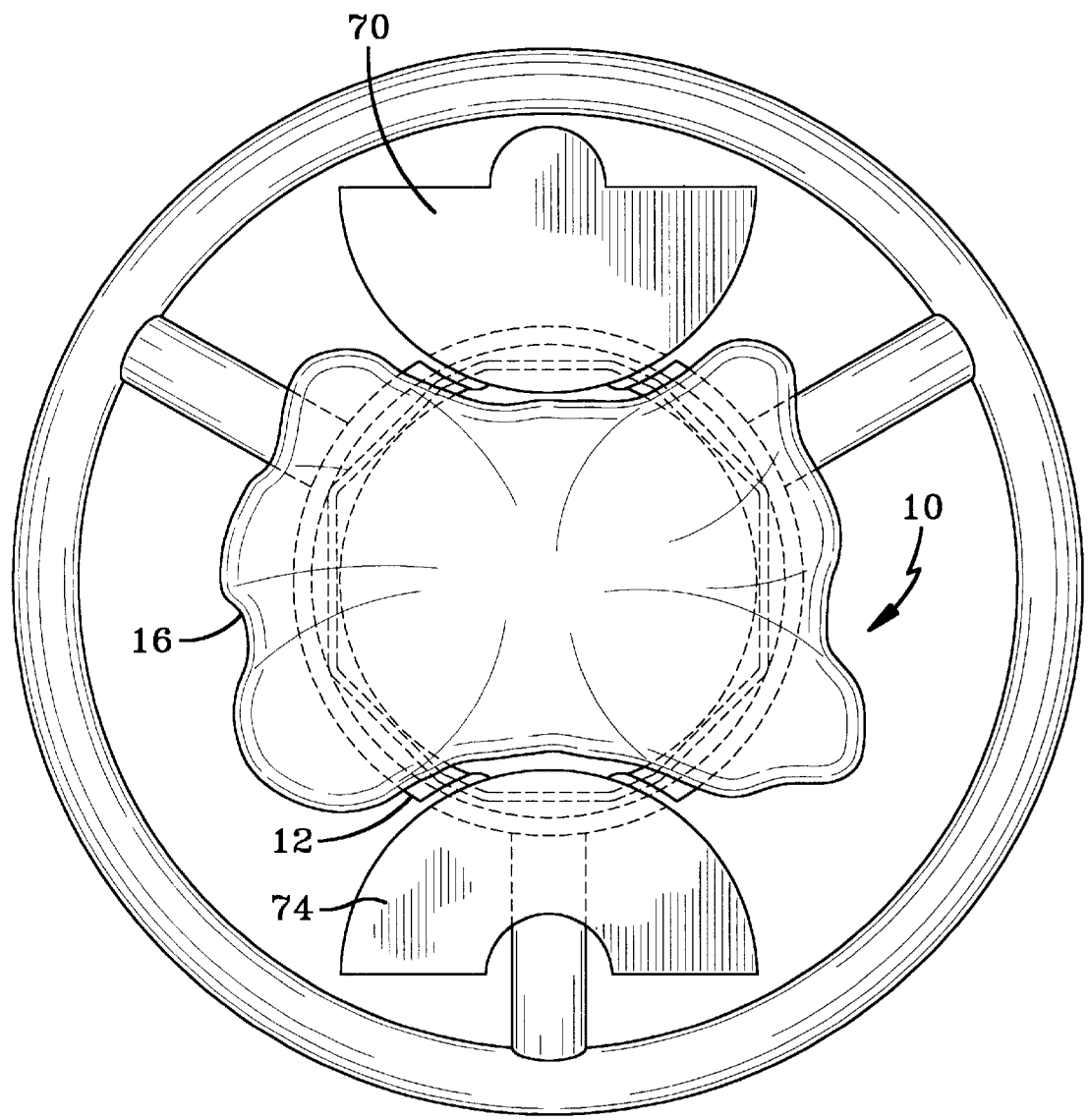
FIG. 1 a front view of the airbag cover mounted to a steering wheel, with the airbag shown in a partially deployed condition.

Referring now to the drawings wherein the showings are for purposes of illustrating a preferred embodiment of the invention only and not for purposes of limiting the same, an airbag cover 10 embodying a tear seam 12 is illustrated in FIGS. 1, 2, 6, and 7. The tear seam 12 is more clearly shown in FIGS. 3, 4, 5, 8, 9 and 10.

With reference now to FIGS. 1–7, the airbag cover 10 has a tear seam 12 therein. Referring to FIGS. 1, 2, 6 and 7, the tear seam 12 defines first and second deployment doors 70, 74 in the airbag cover 10. Upon the deployment of the airbag 16 the tear seam 12 tears and deployment doors 70, 74 open. The airbag 16 is thus deployed through the airbag cover 10.

Figure 2:
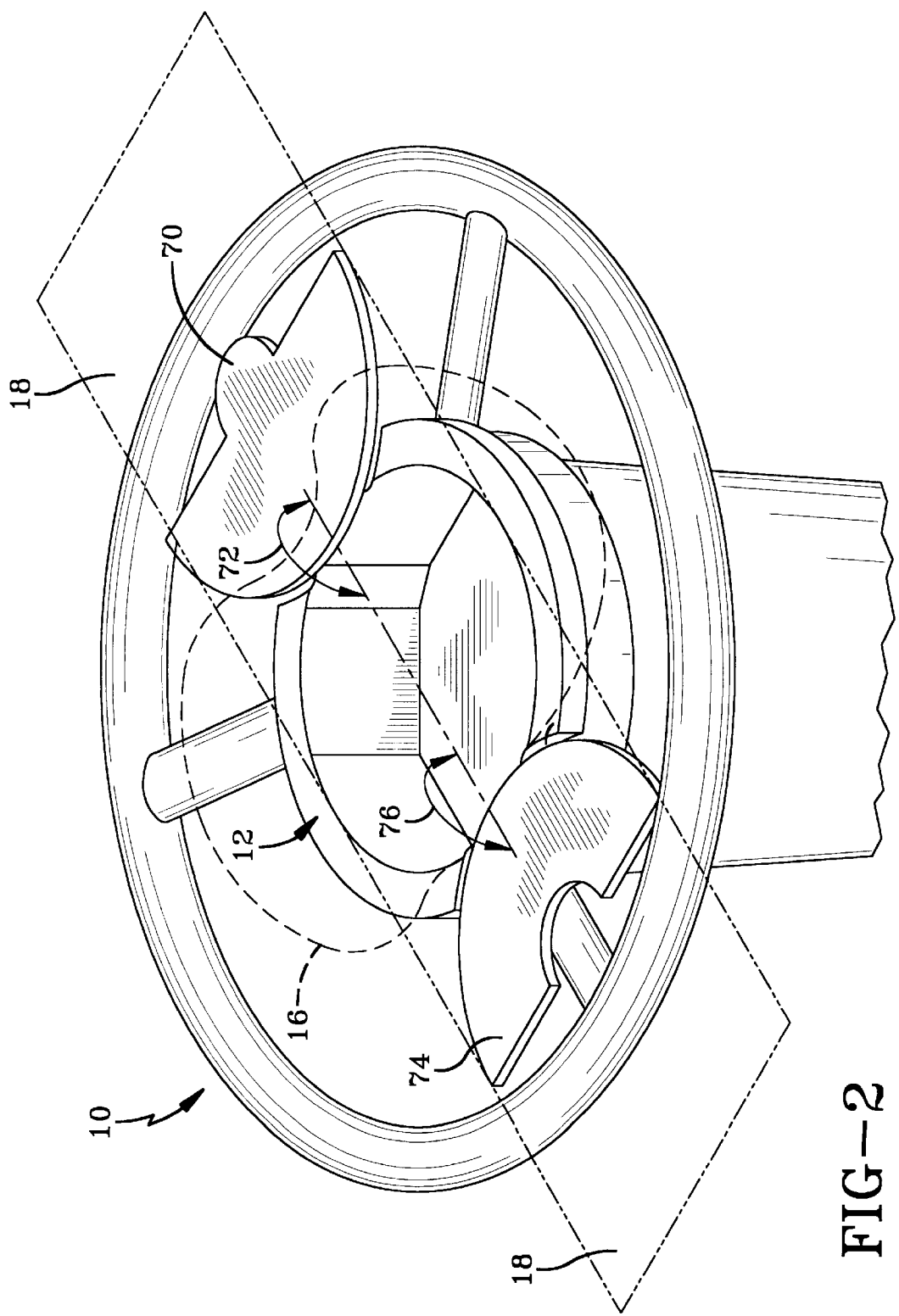
FIG. 2 is a perspective view of the cover mounted to a steering wheel, shown with the cover being opened as when the airbag has deployed.
Figure 7:
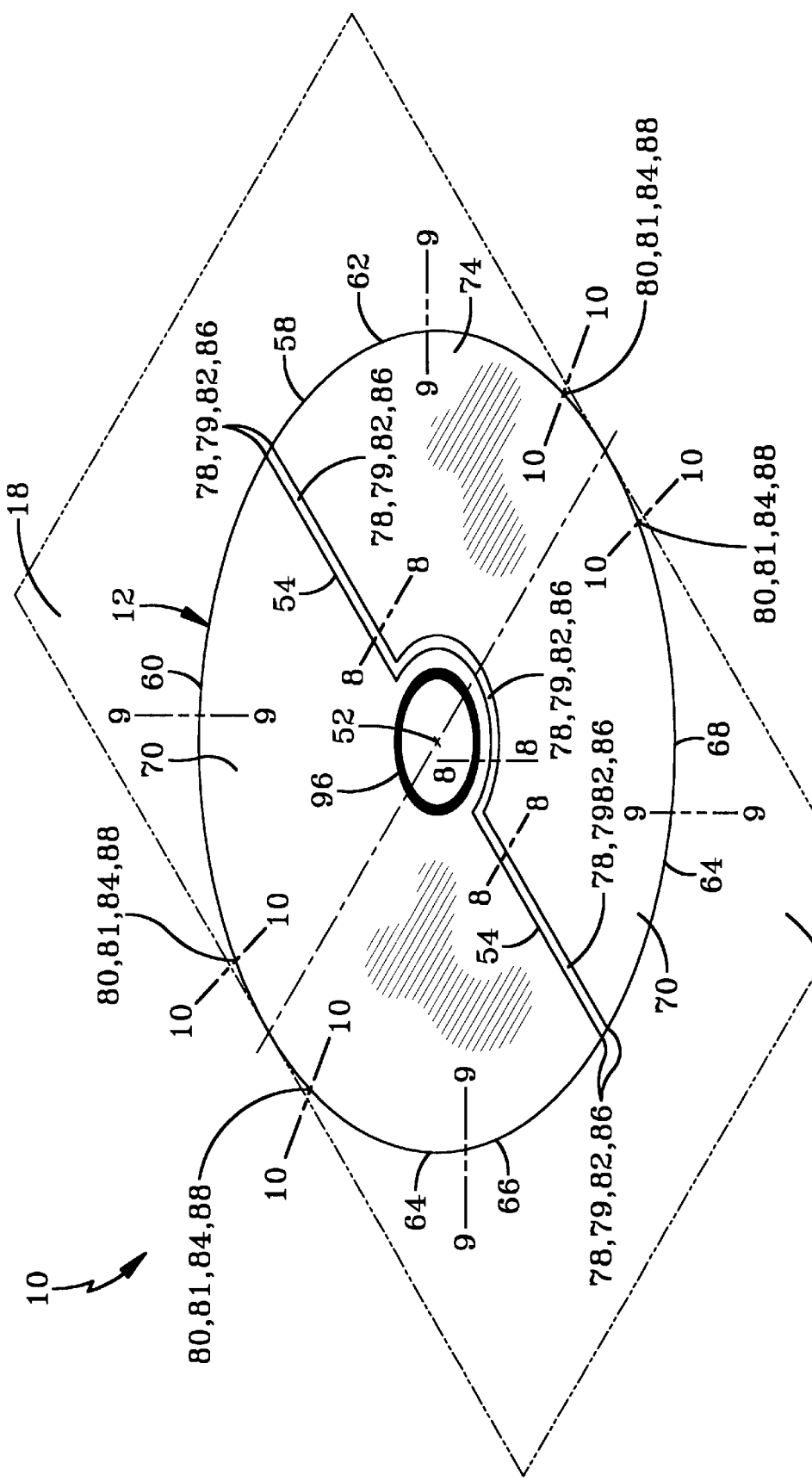
FIG. 7 is a perspective view of the airbag cover shown in a closed position.

With reference to FIGS. 2 and 7, the airbag cover 10 and deployment doors 70, 74 are in a plane 18 that has a high radius of curvature or is essentially flat prior to the deployment of the airbag 16.

With references to FIGS. 1, 2, 6, 7 and 11 the airbag cover 10 further comprises first and second hinges 48, 50 about which the deployment doors pivot open upon the deployment of the airbag 16. In addition to permitting the deployment doors 70, 74 to open, the hinges prevent the deployment doors 70, 74 from completely detaching from the airbag cover.

Figure 3:
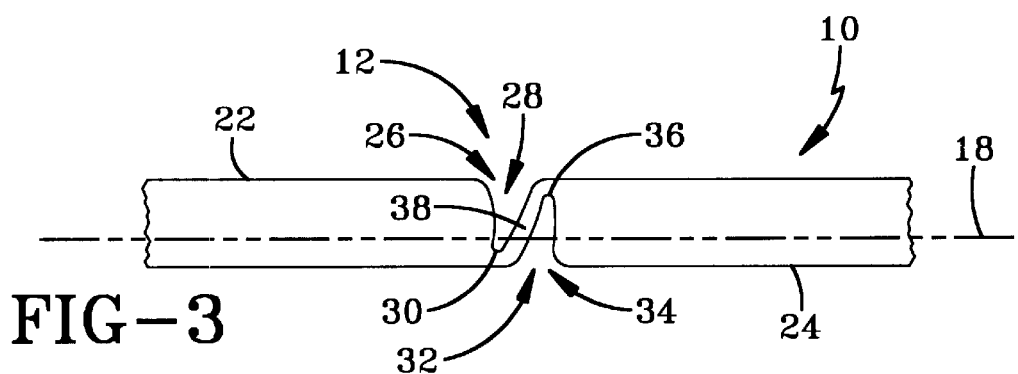
FIG. 3 is a cross-sectional view of the airbag cover showing the tear seam.
Figure 4:
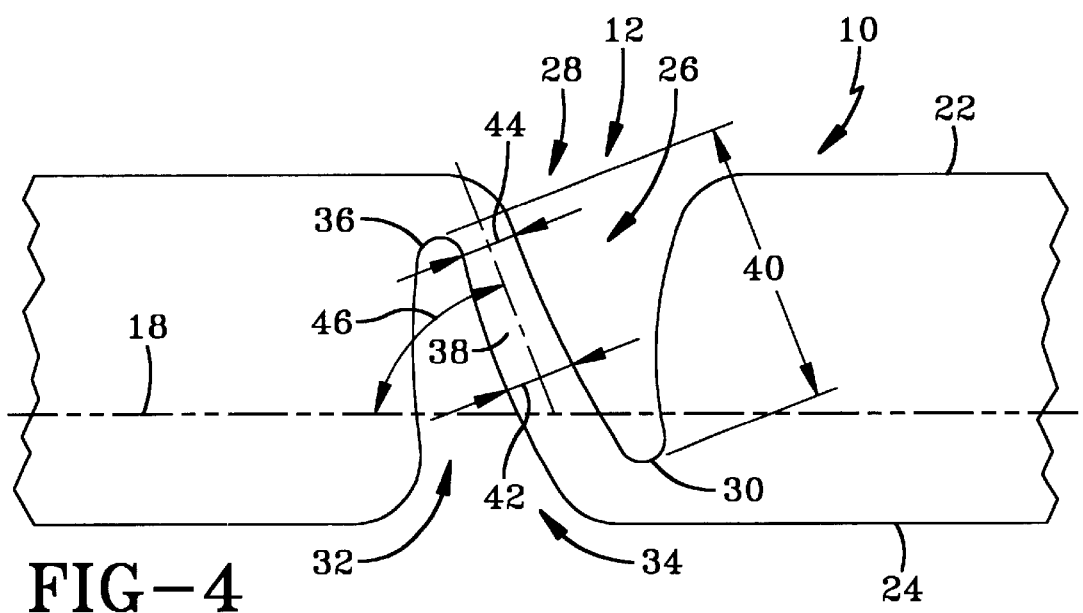
FIG. 4 is a magnified cross-section of the airbag cover showing the tear seam.
Figure 5:
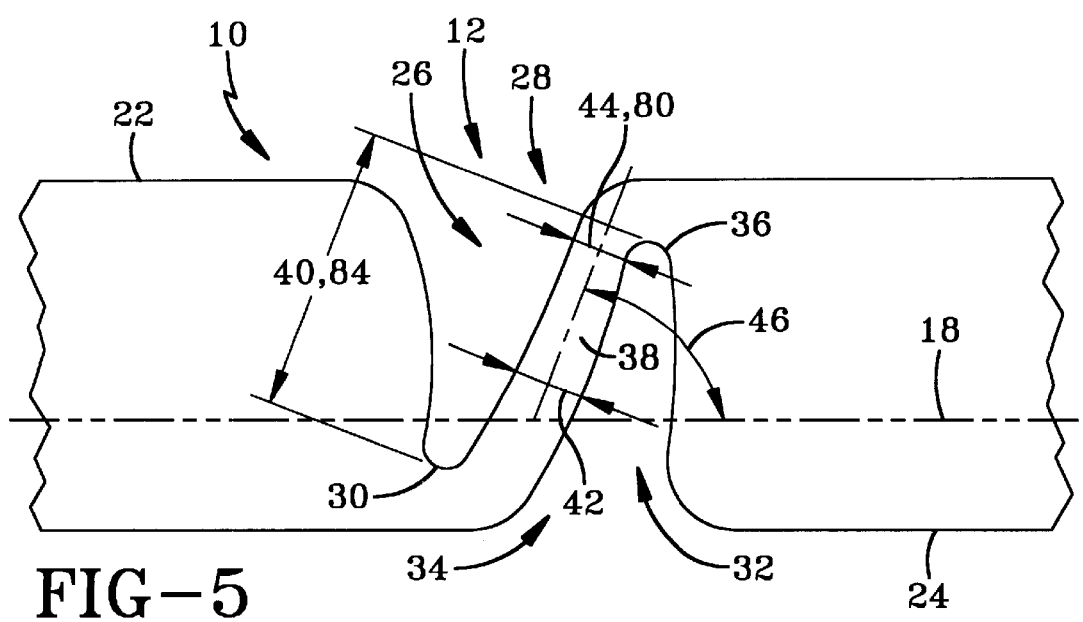
FIG. 5 is a magnified cross-section of another embodiment of the airbag cover showing the tear seam.

Referring to FIGS. 3, 4, and 5 the airbag cover 10 has front and back sides 22, 24. As used herein and in the claims the term "front" refers to a side or surface of an airbag cover that faces towards a vehicle occupant when the airbag cover is installed in its operative location in a vehicle. As used herein and in the claims the term "back" refers to a side or surface of an airbag cover that faces away from a vehicle occupant when the airbag cover is installed in its operative location in a vehicle.

The tear seam 12 has a front groove 26 in the front side 22 of the airbag cover 10. The front groove 26 has a front open top 28 and a front closed bottom 30. The tear seam 12 also has a back groove 32 in the back side 24 of the airbag cover 10. The back groove 32 has a back open top 34 and a back closed bottom 36.

With continuing reference to FIGS. 3, 4, and 5, the tear seam 12 has a transverse layer 38 separating the front 26 and back 32 grooves. The transverse layer 38 traverses from the closed bottom of one of the grooves to the closed bottom of the other groove.

Referring to FIGS. 4,5,8,9 and 10, the transverse layer 38 has a length that is measured from the closed bottom of one of the grooves to the closed bottom of the other groove, as shown at reference character 40. The transverse layer 38 has a thickness 42 which varies along the length 40 of the transverse layer 38. The transverse layer 38 of the tear seam 12 tears upon the deployment of the airbag 16 at a point along the length of the transverse layer 38 where the thickness 42 is at minimum.

With reference to FIGS. 3, 4, and 5, the transverse layer 38 of the tear seam 12 in the airbag cover forms an angle 46 with respect to the flat plane 18. The angle 46 is less than or equal to 90° and greater than or equal to 0°. In the preferred embodiment the angle 46 is equal to 72 degrees.

Figure 8:
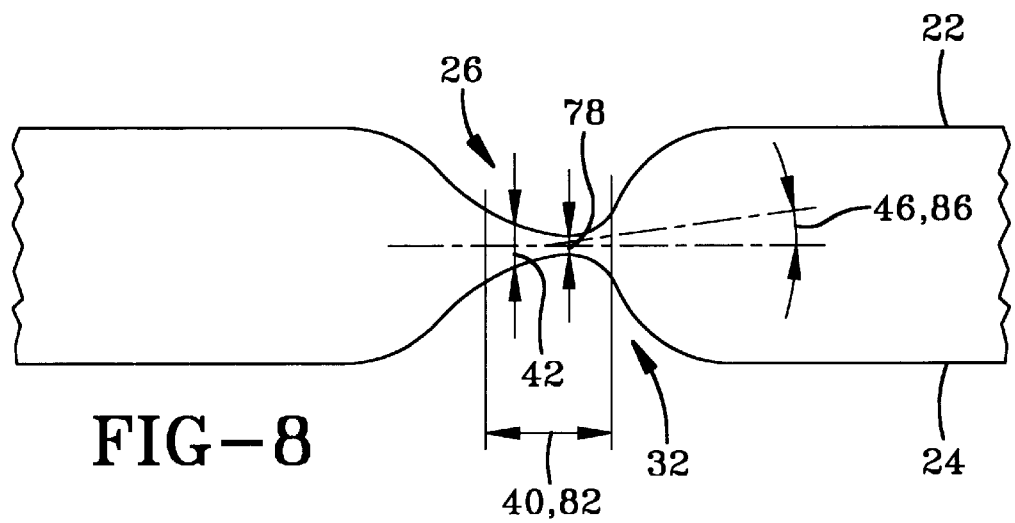
FIG. 8 is a cross-sectional view of the tear seam along lines 8—8 of FIGS. 6 and 7.
Figure 9:
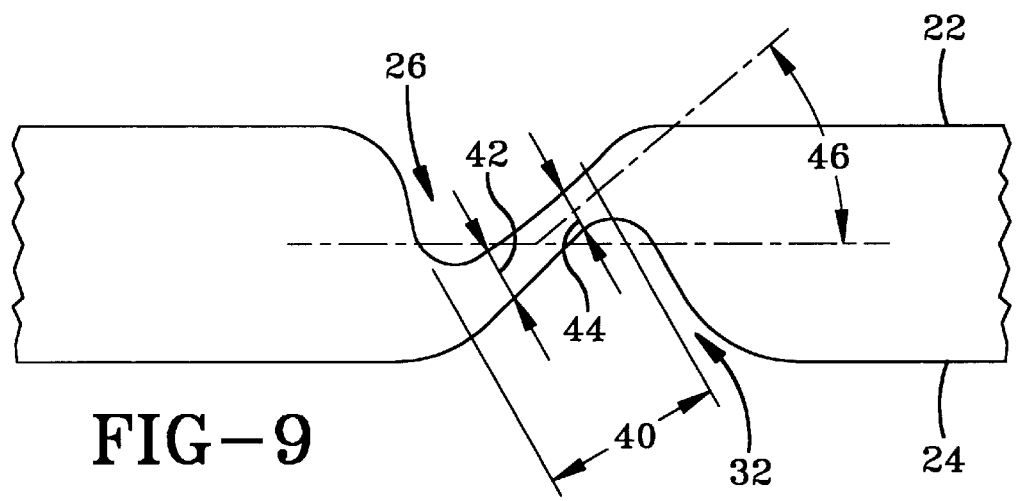
FIG. 9 is a cross sectional view of the tear seam along lines 9—9 of FIGS. 6 and 7.
Figure 10:
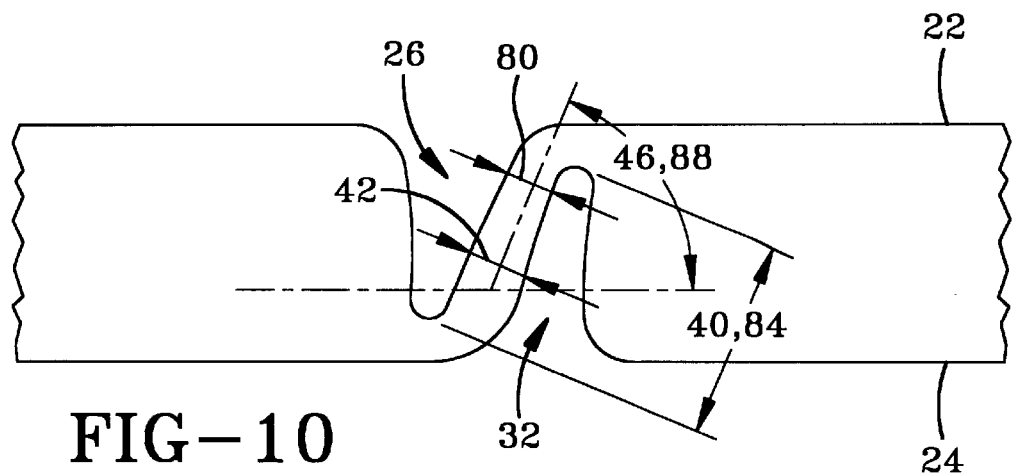
FIG. 10 is a cross sectional view of the tear seam along lines 10—10 of FIGS. 6 and 7; and, FIG. 11 is a back view of the airbag cover showing the tear seam, hinges and reinforcing means. This is the view that the airbag sees before deploying through the airbag cover.

Referring now to FIGS. 8, 9 and 10, according to one embodiment of the present invention, the depths of the front 26 and back 32 grooves of the tear seam 12 vary at different locations along the tear seam. This variation correspondingly slightly varies the length 40 of the transverse layer 38.

Referring now to FIGS. 1, 2, 6, 7 and 11, an important aspect of the invention is that the airbag cover 10 may have a non-rectangular configuration, such as an essentially circular configuration as is illustrated. The related art only discloses rectangular or square airbag covers.

Figure 11:
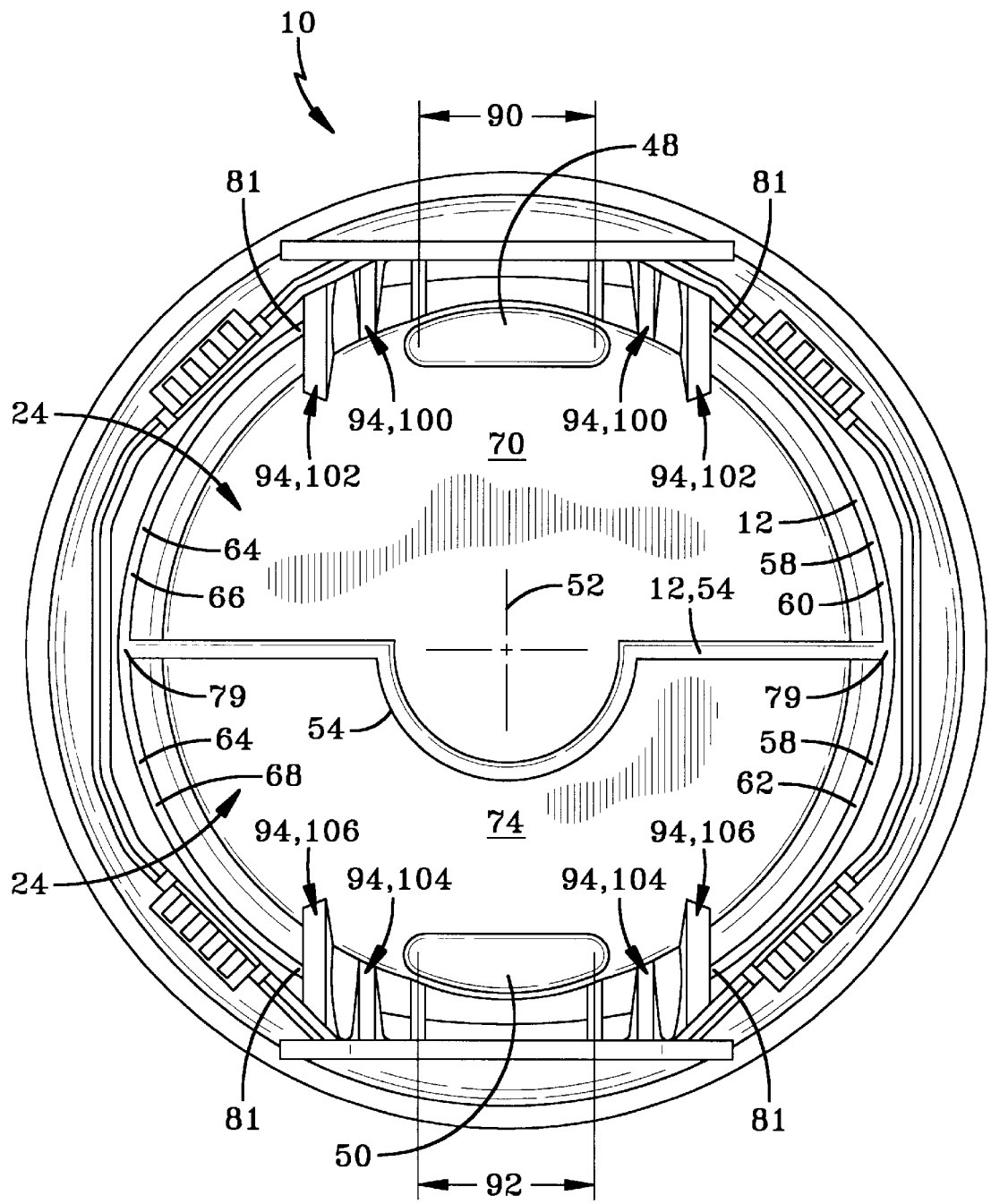

As shown in FIG. 11, The airbag cover 10 has first and second hinges 48, 50. The first and second hinges are situated diametrically opposite from each other along the perimeter of the circular airbag cover 10. Thus, the first and second hinges are separated by an angle 52 of 180° as shown in FIGS. 6, 7 and 11.

Figure 6:
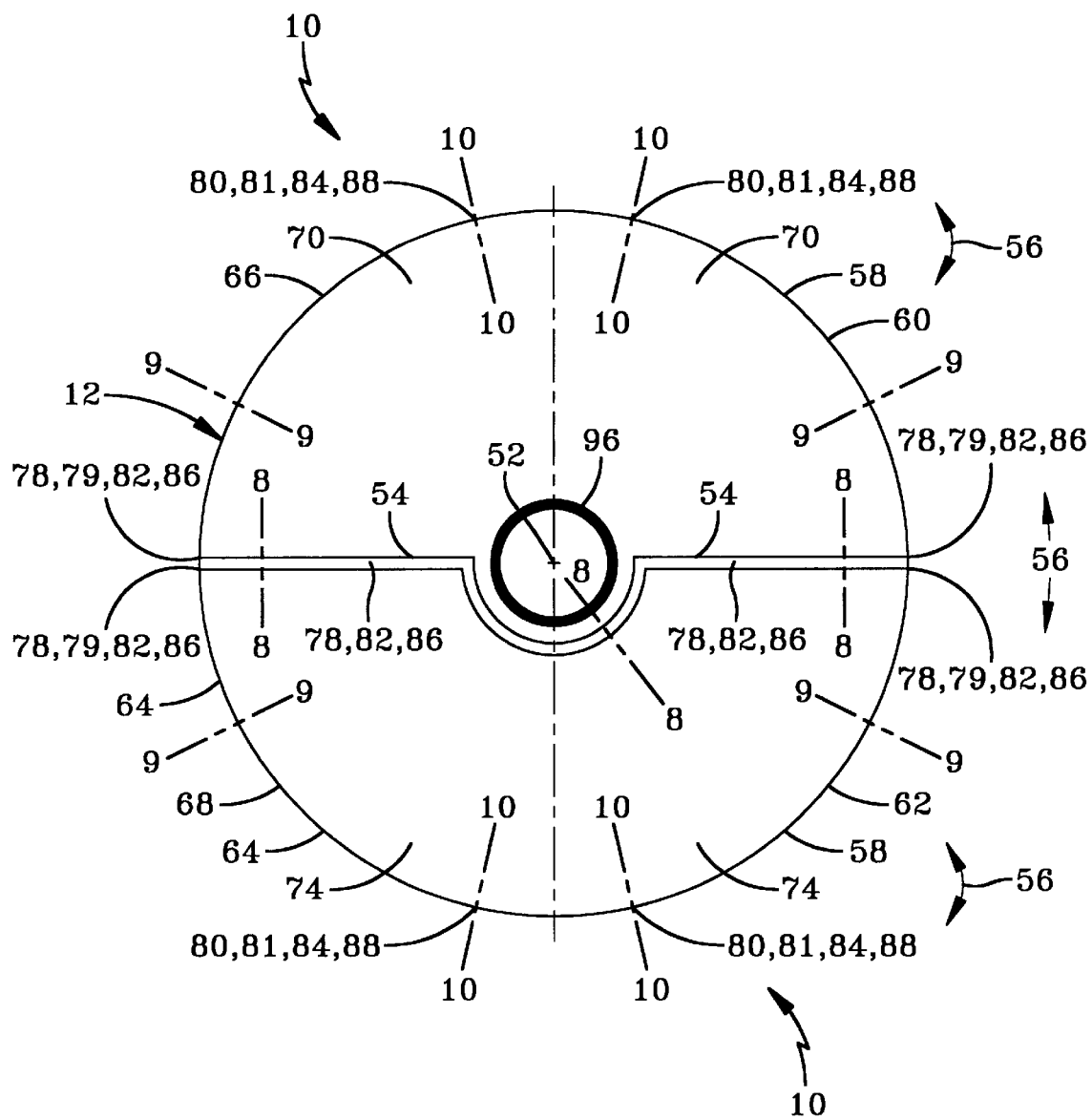
FIG. 6 is a front view of the airbag cover shown with airbag cover being closed as before the airbag deploys.

With reference to FIGS. 6 and 7, the tear seam 12 preferably comprises a first tear seam segment 54 within the circular airbag cover 10. This first tear seam segment 54 extends across the diameter of the circular airbag cover 10 such that it is parallel to the first and second hinges 48, 50. Thus, the first tear seam segment 54 forms an angle 56 with respect to the first and second hinges. In the preferred embodiment, the angle 56 is equal to zero degrees.

With continuing reference to FIGS. 6 and 7, the tear seam 12 also comprises a second tear seam segment 58 along one half of the perimeter of the circular airbag cover between the first and second hinges 48, 50. The second tear seam segment 58 is bisected by the first tear seam segment 54. The second tear seam segment 58 thereby comprises an upper 60 second tear seam segment half and a lower 62 second tear seam segment half.

The tear seam 12 further comprises a third tear seam segment 64 along the remaining one half the perimeter circular airbag cover. The third tear seam segment 64 extends between the first and second hinges 48, 50. The third tear seam segment 64 is situated opposite the second tear seam segment 58 along the perimeter of the circular airbag cover 10. The third tear seam segment 64 is bisected by the first tear seam segment 54 thereby comprising an upper 66 third tear seam segment half and a lower 68 third tear seam segment half.

Referring now to FIGS. 1, 2, 6, 7 and 11, the first tear seam segment 54, upper second tear seam segment half 60 and upper third tear seam segment half 66 form a first deployment door 70 in the circular airbag cover 10. The first deployment door 70 pivots open on said first hinge 48 upon the deployment of the airbag 16 and the tearing of first tear seam segment 54, upper second tear seam segment half 60 and upper third tear seam segment half 66. Upon opening, the first deployment door 70 forms an angle 72 with respect to the substantially flat plane 18. The angle 72 is less than or equal to 270°.

With continuing reference to FIGS. 1, 2, 6, 7 and 11 the first tear seam segment 54, lower second tear seam segment half 62 and lower third tear seam segment half 68 form a second deployment door 74 in the circular airbag cover 10. The second deployment door pivots open on the second hinge 50 upon the deployment of the airbag 16 and the tearing of the first tear seam segment 54, lower second tear seam segment half 62 and lower third tear seam segment half 68. Upon opening, the second deployment door 74 forms an angle 76 with respect flat plane 18. The angle 76 is less than or equal to 270°.

With reference to FIGS. 3–11, the minimum thickness 44 of the transverse layer 38 along the length 40 of the transverse layer has different values at different locations along the tear seam 12.

As shown in FIGS. 6, 7, 8 and 11, the minimum thickness 44 has its minimum value 78 along the first tear seam segment 54 and near a point 79 where the first tear seam segment 54 bisects the second 58 and third 64 tear seams.

With reference to FIGS. 3–11, the minimum thickness 44 of the transverse layer 38 along the length 40 of the transverse layer has different values at different locations along the tear seam 12.

With reference to FIGS. 6, 7, 10 and 11, the minimum thickness 44 has its maximum value 80 at the point 81 on the upper second 60 and upper third 66 tear seam halves near the first hinge 48 and at the point 81 on the lower second 62 and lower third 68 tear seam halves near the second hinge 50.

Preferably, the minimum thickness 44 of the transverse layer 38 along the length 40 of the transverse layer 38 gradually transitions between thicknesses 78 and 80 along the upper second 60, upper third 66, lower second 62 and lower third 68 tear seam halves. A transitioning transverse layer is shown in FIG. 9, which is a cross sectional view of the transverse layer along lines 9—9 of FIGS. 6 and 7.

With reference to FIGS. 6, 7, 8 and 11, the length 40 of the transverse layer 38 is preferably a minimum 82 along the first tear seam segment 54 and near the locations 79 wherein the first tear seam segment 54 bisects the second 58 and third 64 tear seams.

Referring now to FIGS. 6, 7, 10 and 11, the length 40 of the transverse layer 38 is at a maximum length 84 near the locations 81 on the upper second 60 and upper third 66 tear seam halves near the first hinge 48 as well as the locations 81 on the lower second 62 and lower third 68 tear seams halves near the second hinge 50.

Referring now to FIGS. 5 and 6, preferably, the length 40 of the transverse layer 38 of the tear seam 12 gradually transitions between lengths 84 and 82 along the upper second 60, upper third 66, lower second 62 and lower third 68 tear seam halves.

The varying lengths and thicknesses of the transverse layer 38 of the tear seam 12 enable controllable operation of the airbag cover 10. The minimum thickness 78 which is preferably located along the first tear seam segment provides that the first tear seam segment will tear first upon deployment of the airbag 16. The thickness of the transverse layer 38 of the tear seam 12 increases as one moves from that point along the perimeter of the airbag cover 10 towards the first and second hinges 48, 50. This feature helps control the rate at which the first 70 and second 74 deployment doors pivot open upon deployment of the airbag 16.

The decreased length 40 of the transverse layer 38 at the first tear seam segment 54 provides sufficient strength and rigidity of the tear seam 12 such that the airbag cover 10 will not fail due to fatigue failure at the first tear seam segment 54 when the center of the airbag cover 10 is depressed, for example when the operator of the motor vehicle operates the motor vehicle's horn.

Referring now to FIGS. 3–11, the angle 46 of the transverse layer 38 relative to the substantially flat plane 18 has preferred values at particular locations along the tear seam 12 in order to obtain the desired strength and rigidity and to prevent fatigue failure of the transverse layer of the tear seam.

Referring to FIGS. 6, 7, 8 and 11, angle 46 is at a minimum 86 along the first tear seam segment 54 and near the locations 79 wherein the first tear seam segment 54 bisects the second 58 and third 64 tear seams.

Referring to FIGS. 6, 7, 10 and 11, the angle 46 has a maximum value 88 near the locations 81 on the upper second 60 and upper third 66 tear seam halves near the first hinge 48 and near the locations on the lower second 62 and lower third 68 tear seam halves near the second hinge 50.

With reference to FIG. 9, preferably, the angle 46 of the transverse layer 38 of the tear seam 12 gradually transitions between angles 88 and 86 along the upper second 60, upper third 66, lower second 62, and lower third 68 tear seam halves. In the preferred embodiments, the angle 86 is zero degrees and the angle 88 is seventy-two degrees.

According to another aspect of the current invention, the ratio of the maximum thickness 78 to the minimum thickness 80 is less than or equal to 2. This ensures that the aforementioned desired characteristics of the current invention are obtained. Preferably, the minimum thickness 78 has a value of about 0.5 mm and the maximum thickness 80 has a value of about 0.75 mm.

With reference to FIG. 11, the hinges 48, 50 may be formed within the airbag cover 10 by molding the back side 24 of the airbag cover 10 corresponding to the locations of the first and second hinges 48, 50. The hinges pivot on generally linear hinge lines. The lengths of the hinge lines, as indicated at 90 and 92, may be between about 0.5 and about 3.0 inches but is preferably about 1.25 inches.

With continuing reference to FIG. 11, the airbag cover 10 also has reinforcing means 94. The reinforcing means 94 is connected to the hinges 48, 50 and prevents the deployment doors 70, 74 from completing detaching from the airbag cover 10 upon the tearing the tear seam 12, opening of the deployment doors and deployment of the airbag 16. Preferably there are first 100 and second 102 upper reinforcing means for the first hinge 48 as well as first 104 and second 106 lower reinforcing means for the second hinge 50. These reinforcing means help to prevent injury to the occupant of the motor vehicle upon the deployment of the airbag.

Preferably the reinforcing means as well as the airbag cover, hinges, deployment doors and tear seam are all cast or molded out of an elastic polymer having somewhat rigid properties. The preferred material is a polymer available from Dupont and designated by their product code "DYM-350."

Another important advantage of the invention is that a decorative emblem can be incorporated into the tear seam design. Many vehicle owners take great pride in their vehicles. It can be important to them to be reminded of their purchase whenever they look down at the steering wheel. Vehicle manufacturers also benefit by encouraging brand loyalty and pride by prominently portraying the vehicle logo. With reference to FIGS. 6 and 7, the present invention contemplates a tear seam 12 configured within the airbag cover 10 such that an emblem 96 can be mounted anywhere on the front side 22 of the airbag cover 10 and remain safely attached to the airbag cover 10 during and throughout the deployment of the airbag 16. The emblem 96 can be mounted by any fastening method chosen with sound engineering judgment.

With continuing reference to FIGS. 6 and 7, in such a configuration, the tear seam 12 and a portion of the emblem 96 are adjacent to each other. The tear seam 12 essentially follows a portion of the perimeter of the emblem 96. Such design encourages the emblem 96 to remain affixed to the airbag cover 10 during deployment of the airbag 10. The tear seam 12 tears around the emblem 96 without affecting the emblem's fixation to the airbag cover 10. After the airbag 16 deploys and the tear seam 12 tears, the emblem remains attached to the first deployment door 70 which pivots back. The emblem 96 represented in FIGS. 6 and 7 is illustrated as circular and mounted in the center of the airbag cover 10. However, the present invention contemplates mounting an emblem of any shape onto any location of any shaped airbag cover.

While the invention has been described in connection with specific embodiments and applications, no intention to restrict the invention to the examples shown is contemplated. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. An airbag cover having an essentially circular configuration, first and second hinges being situated essentially opposite each other along the perimeter of said airbag cover, and a tear seam in the airbag cover wherein said tear seam comprises:
   a first tear seam segment located within said airbag cover along a diameter of said circular airbag cover, said first tear seam segment being parallel to said first and second hinges;
   a second tear seam segment located within said airbag cover along one half of the perimeter of said circular airbag cover between said first and second hinges, said second tear seam segment being bisected by said first tear seam segment, said second tear seam segment thereby comprising upper and lower second tear seam segment halves; and,
   a third tear seam segment located within said airbag cover along the remaining one half of the perimeter of said airbag cover between said first and second hinges, said third tear seam segment being opposingly situated along the perimeter of said airbag cover relative to said second tear seam segment, said third tear seam segment being bisected by said first tear seam segment, said third tear seam segment thereby comprising upper and lower third tear seam segment halves.

2. The airbag cover of claim 1 wherein said first tear seam segment, said upper second tear seam segment half and said upper third tear seam segment half form an upper deployment door in said airbag cover, said upper deployment door capable of hinging open on said first hinges upon the deployment of said airbag and the tearing of said first tear seam segment.

3. The airbag cover of claim 2 wherein said upper second tear seam segment half and upper third tear seam segment half, and said upper deployment door form an angle Au with respect to said essentially flat plane upon deployment of the airbag, said angle being less than or equal to 270 degrees.

4. The airbag cover of claim 1 wherein said tear seam further comprises:
   a transverse layer;
   a front groove in a front side of said airbag cover, said front groove having a front open top and a front closed bottom; and
   a back groove in a back side of said airbag cover, said back groove having a back open top and a back closed bottom, said transverse layer separating said front and back grooves, said transverse layer traversing from said closed bottom of one of said grooves to said closed bottom of the other of said grooves, a length of said transverse layer being measured from said closed bottom of one of said grooves to said closed bottom of the other of said grooves, wherein said length is at a minimum Lmin along said first tear seam segment and near a point on said upper second, upper third, lower second and lower third tear seam segment halves where said first tear seam segment bisects said second and third tear seam segments.

5. The airbag cover of claim 1 wherein said tear seam further comprises:
   a transverse layer;
   a front groove in a front side of said airbag cover, said front groove having a front open top and a front closed bottom; and,
   a back groove in a back side of said airbag cover, said back groove having a back open top and a back closed bottom, said transverse layer separating said front and back grooves, said transverse layer traversing from said closed bottom of one of said grooves to said closed bottom of the other of said grooves, a length of said transverse layer being measured from said closed bottom of one of said grooves to said closed bottom of the other of said grooves, wherein said length is at a maximum at the point on said upper second and upper third tear seam segment halves nearest to said first hinge.

6. The airbag cover of claim 1 wherein said tear seam further comprises:
   a transverse layer;
   a front groove in a front side of said airbag cover, said front groove having a front open top and a front closed bottom; and,
   a back groove in a back side of said airbag cover, said back groove having a back open top and a back closed bottom, said transverse layer separating said front and back grooves, said transverse layer traversing from said closed bottom of one of said grooves to said closed bottom of the other of said grooves, a length of said transverse layer being measured from said closed bottom of one of said grooves to said closed bottom of the other of said grooves, wherein said length of said transverse layer of said tear seam gradually transitions between minimum and maximum lengths along said upper second, upper third, lower second and lower third tear seam segment halves.

7. The airbag cover of claim 1 wherein said tear seam has a transverse layer, said transverse layer having a centerline that makes an angle with an approximately flat plane containing a front side of said airbag cover, said angle having a first value at a first point of said tear seam and a second value at a second point of said tear seam, wherein said angle is at a minimum along said first tear seam segment near a point on said upper second, upper third, lower second and lower third tear seam segment halves wherein said first tear seam segment bisects said second and third tear seam segments.

8. The airbag cover of claim 1 wherein said tear seam has a transverse layer, said transverse layer having a centerline that makes an angle with an approximately flat plane containing a front side of said airbag covers, said angle having a first value at a first point of said tear seam and a second value at a second point of said tear seam, wherein said angle is at a maximum at the point on said upper second and upper third tear seam segment halves nearest to said first hinge, and at the point on said lower second and lower third tear seam segment halves nearest said second hinge.

9. The airbag cover of claim 1 wherein said tear seam has a transverse layer, said transverse layer having a centerline that makes an angle with an approximately flat plane containing a front side of said airbag cover, said angle having a first value at a first point of said tear seam and a second value at a second point of said tear seam, wherein said angle of said transverse layer of said tear seam gradually transitions between a maximum angle and a minimum angle along said upper second, upper third, lower second and lower third tear seam segment halves.

* * * * *